United States Patent
Purdy et al.

(10) Patent No.: US 11,840,913 B2
(45) Date of Patent: Dec. 12, 2023

(54) METHODS FOR STIMULATION OF HYDROCARBON-BEARING FORMATIONS WHILE INHIBITING CORROSION OF METAL SURFACES CONTACTED BY ACID SOLUTIONS USED IN STIMULATION

(71) Applicant: Fluid Energy Group Ltd., Calgary (CA)

(72) Inventors: Clay Purdy, Medicine Hat (CA); Markus Weissenberger, Calgary (CA); Adrienne Lee, Calgary (CA)

(73) Assignee: DORF KETAL CHEMICALS FZE, Fujairah (AE)

( * ) Notice: Subject to any disclaimer, the term of this patent is extended or adjusted under 35 U.S.C. 154(b) by 0 days.

(21) Appl. No.: 17/614,181

(22) PCT Filed: May 8, 2020

(86) PCT No.: PCT/CA2020/000059
§ 371 (c)(1),
(2) Date: Nov. 24, 2021

(87) PCT Pub. No.: WO2020/223790
PCT Pub. Date: Nov. 12, 2020

(65) Prior Publication Data
US 2022/0333472 A1 Oct. 20, 2022

(30) Foreign Application Priority Data

May 9, 2019 (CA) .................................. CA 3042803

(51) Int. Cl.
*E21B 43/26* (2006.01)
*E21B 43/27* (2006.01)
(Continued)

(52) U.S. Cl.
CPC .............. *E21B 43/261* (2013.01); *C09K 8/54* (2013.01); *C09K 8/74* (2013.01); *E21B 37/06* (2013.01); *E21B 43/27* (2020.05); *C09K 2208/32* (2013.01)

(58) Field of Classification Search
CPC ........ E21B 43/261; E21B 43/27; E21B 37/06; C09K 8/54; C09K 8/74; C09K 2208/32
See application file for complete search history.

(56) References Cited

U.S. PATENT DOCUMENTS 5,894,888 A * 4/1999 Wiemers .................. C09K 8/72
166/308.1
5,976,416 A 11/1999 Brezinski
(Continued)

OTHER PUBLICATIONS

International Search Report in International Application PCT/CA2020/000059 dated Aug. 5, 2020, 3 pages.
(Continued)

*Primary Examiner* — Silvana C Runyan
(74) *Attorney, Agent, or Firm* — Berg Hill Greenleaf Ruscitti LLP

(57) ABSTRACT

A method for stimulation of a hydrocarbon-bearing formation includes inserting a perforating tool and an acidic composition into a wellbore. An outside surface of the tool is pre-treated prior to downhole insertion with a grease containing a first corrosion inhibitor adapted minimize corrosion by exposure of the tool the acidic composition for a duration of the stimulation process. The acidic composition further comprises a second corrosion inhibitor that reacts with the first corrosion inhibitor to generate a corrosion protective layer onto the outside surface of the tool. The method further includes perforating the wellbore with the tool, allowing the acidic composition to come into contact with the perforated area of the wellbore, removing the tool
(Continued)

from the wellbore; and initiating the stimulation of the perforated area using a stimulation fluid.

1 Claim, 5 Drawing Sheets

(51) Int. Cl.
*C09K 8/54* (2006.01)
*C09K 8/74* (2006.01)
*E21B 37/06* (2006.01)

(56) References Cited

U.S. PATENT DOCUMENTS

| | | | |
|---|---|---|---|
| 6,866,797 B1 * | 3/2005 | Martin | C09K 8/54 |
| | | | 507/939 |
| 7,994,101 B2 * | 8/2011 | Cassidy | C23F 11/10 |
| | | | 507/263 |
| 10,407,610 B2 * | 9/2019 | Lablanc | C23F 11/04 |
| 2007/0071887 A1 | 3/2007 | Cassidy et al. | |
| 2012/0091396 A1 | 4/2012 | Setlur et al. | |

OTHER PUBLICATIONS

Written Opinion in International Application PCT/CA2020/000059 dated Aug. 5, 2020, 5 pages.

* cited by examiner

METHODS FOR STIMULATION OF HYDROCARBON-BEARING FORMATIONS WHILE INHIBITING CORROSION OF METAL SURFACES CONTACTED BY ACID SOLUTIONS USED IN STIMULATION

CROSS REFERENCE TO RELATED APPLICATION

This application is a national stage application under 35 U.S.C. 371 of PCT Application No. PCT/CA2020/000059 having an international filing date of May 8, 2020, which designated the United States, which PCT application claimed the benefit of Canadian Application Serial No. 3,042,803, filed May 9, 2019, both of which are incorporated by reference in their entirety.

FIELD OF THE INVENTION

This invention relates to a method for performing enhanced recovery operations on a hydrocarbon-bearing stimulation, more specifically to a corrosion inhibitor composition and a method to enhance well productivity for substantially reducing time and water use when performing various oilfield operations such as, hydraulically fracturing operations.

BACKGROUND OF THE INVENTION

In the oil & gas industry, stimulation with an acid is performed on a well to increase or restore production. In some instances, a well initially exhibits low permeability, and stimulation is employed to commence production from the reservoir. In other instances, stimulation or remediation is used to further encourage permeability and flow from an already existing well that has become underproductive due to scaling issues or formation depletion.

Acidizing is a type of stimulation treatment which is performed above or below the reservoir fracture pressure in an effort to initiate, restore, or increase the natural permeability of the reservoir. Acidizing is achieved by pumping acid, predominantly hydrochloric acid, into the well to dissolve typically limestone, dolomite, calcite, and cement between the acid insoluble sediment grains of the reservoir rocks or to treat scale accumulation.

There are three major types of acid applications: matrix acidizing, fracture acidizing, and breakdown acidizing (pumped prior to a fracturing pad or cement operation in order to assist with formation breakdown (reduce fracture pressures, increased feed rates)), as well as clean up left over cement in the well bore or perforations.

A matrix acid treatment is performed when acid is pumped into the well and into the pores of the reservoir formation below the fracture pressure. In this form of acidization, the acids dissolve the sediments formation and/or mud solids that are inhibiting the permeability of the rock, enlarging the natural pores of the reservoir (wormholing) and stimulating the flow of hydrocarbons to the wellbore for recovery.

While matrix acidizing is done at a low enough pressure to keep from fracturing the reservoir rock, fracture acidizing involves pumping acid into the well at a very high pressure, physically fracturing the reservoir rock and etching the permeability inhibitive sediments. This type of acid treatment forms channels or fractures through which the hydrocarbons can flow, in addition to forming a series of wormholes. In some instances, a proppant is introduced into the fluid which assists in propping open the fractures, further enhancing the flow of hydrocarbons into the wellbore. There are many different mineral and organic acids used to perform an acid treatment on wells. The most common type of acid employed on wells to stimulate production is hydrochloric acid (HCl), which is useful in stimulating carbonate reservoirs.

It has been estimated that fracking can improve the production of a well by at least 10-20%. Also, well known to the person of ordinary skill in the art, a well can be fracked multiple times during it's production life. The process of hydraulic fracturing or fracking requires the following steps. Once the determination of the wellbore's integrity has been assessed, the location of the perforations is determined. Subsequently, after a cement liner is in place, one must clear out the debris, and pump a plug and perforating guns to a desired depth and location. The plug is set slightly beyond the desired location to be stimulated and then the cemented liner in that zone is perforated by using perforating guns, creating a path for fracking fluid to be forced into the shale formation.

The final stage prior to fracking requires the use of perforating guns, typically a string of shaped charges lowered to a predetermined location within the wellbore. Once in position, the perforating gun is discharged and perforates the casing.

According to the conventional process, after the perforation stage is completed, the tools are removed from the well. A ball is pumped down to isolate the zones below the plug. This process applies to solid bridge plugs (no ball). The process entails the wellbore fluid to be squeezed into the perforations at low or reduced rates until the acid reaches the perforations and increases permeability to initiate a fracture and reduce injection pressures.

A large volume of fracturing fluid is then pumped into the desired formation in a well. The high-pressure at which the fracturing fluid is pumped coupled with the constant pumping provide an increase in the fluidic pressure within the formation which leads to fracturing inside the reservoir.

After the fracturing pressure is reached, fracturing fluid containing propping agents are injected into the formation to increase the fractures within the formation and insert proppant to maintain the fractures open. The last step of the fracturing operation before being put back into production is to flush the well from all the loose proppants and fracturing fluids.

A slickline is a single strand wire used in the oil and gas industry to transport tools within a well. It is typically a single wire strand set up on a spool located on what is referred to as a slickline truck. A slickline is connected by the drum and it is spooled off the back of the slickline truck. A slickline is used to lower tools within a wellbore in order to perform a specific operation.

In highly deviated wells, coiled tubing can be used to transport and lower the perforation guns into position, i.e. at a predetermined location. Modern slicklines allow to incorporate fiber optic lines which can communicate real time information to the operator regarding the depth, temperature, and pressure. This type of data provides oil well operators sufficient information to perform a plug and perforation operation by accurately targeting desirable hydrocarbon-bearing formations.

The benefit of this strategy is greater control of the well. Casing the bottom of the hole allows the well to be completed without having to worry about reservoir fluids. It also allows the operator to select the formation which will be fracked in order to obtain increased well production. It also allows the operator to seal off perforated sections, which have had their hydrocarbons extracted.

When perforations are performed, they may sometimes lead to skin damage caused by debris from the perforations to limit or reduce the productivity of a well (i.e. more specifically the targeted hydrocarbon-bearing formation) from the fracking operation.

Accordingly, in light of the state of the art of fracking, there still exists a need to develop a method which reduces the waste of water. The resolution of this problem lies in combining a chemical composition with the mechanical tools in order to achieve a more efficient oil recovery method.

SUMMARY OF THE INVENTION

It is an object of the present invention to provide for a novel method for fracking a well which overcomes some drawbacks of the known prior art processes.

According to an aspect of the present invention, there is provided a method of inhibiting the corrosion of a metal surface contacted by an aqueous acid solution, said method comprising the steps of:
(a) providing a grease for application onto a wireline and a tool attached to said wireline adapted for downhole use;
(b) coating the wireline and tool with said grease, said grease comprising:
at least one corrosion inhibitor compound; and
a grease;
(c) inserting the wireline and tool downhole to perform an oil industry operation;
(d) injecting a corrosive liquid downhole thus exposing the wireline, tool and casing for a period of time to said corrosive liquid;
(e) removing the wireline and tool from the wellbore after completion of said operation.

Preferably, the tool is a perforating tool. Preferably, the perforating tool is a perforating gun.

Preferably, the spearhead acid comprises a corrosion inhibitor adapted to prevent damaging corrosion to the tool during the period of exposure with said tool.

Preferably also, the spearhead acid is selected from the group consisting of: mineral acids, organic acids, modified acids, synthetic acids, and/or combinations thereof. More preferably, the spearhead acid further comprises a corrosion inhibitor. Even more preferably, the spearhead acid is selected from the group consisting of: methanesulfonic acid, HCl:amino acid, or HCl:alkanolamine. Preferably, the amino acid is selected from the group consisting of: lysine, lysine monohydrochloride, alanine, asparagine, aspartic acid, cysteine, glutamic acid, histidine, leucine, methionine, proline, serine, threonine, valine, and/or combinations thereof. Preferably also, the alkanolamine is selected from the group consisting of: monoethanolamine, diethanolamine, triethanolamine, and/or combinations thereof.

According to a preferred embodiment of the present invention, there is provided a corrosion inhibiting composition for use with an acid, said composition comprising: citral and cinnamaldehyde. According to a preferred embodiment, the corrosion inhibiting composition comprises: an alkyne alcohol and a terpene, preferably selected from the group consisting of: citral, carvone, ionone, ocimene, cymene, and/or combinations thereof, most preferably the terpene is citral or cinnamaldehyde and/or a derivative thereof; and a solvent. More preferably, the corrosion inhibiting composition further comprises at least one surfactant. Preferably, the alkyne alcohol is propargyl alcohol.

According to a preferred embodiment, the solvent is selected from the group consisting of: methanol, ethanol, 6,3-ethoxylate, and isopropanol. More preferably, the solvent is isopropanol.

Preferably, the alkyne is present in an amount ranging from 10-40% v/v of the composition. Preferably also, citral is present in an amount ranging from 5-15% v/v of the composition. Preferably also, the cinnamaldehyde or a derivative thereof is present in an amount ranging from 7.5-20% v/v of the composition. Preferably also, the solvent is present in an amount ranging from 10-40% v/v of the composition. According to a preferred embodiment of the present invention, the surfactant is present in an amount ranging from 10-40% v/v of the composition. Preferably, the surfactant comprises a betaine or a sultaine. According to a preferred embodiment, the surfactant comprises a betaine and β-Alanine, N-(2-carboxyethyl)-N-dodecyl-, sodium salt (1:1).

According to another aspect of the present invention, there is provided a method for the fracking or stimulation of a hydrocarbon-bearing formation, said method comprising the steps of:
providing a wellbore in need of stimulation;
inserting a plug in the wellbore at a location slightly beyond a predetermined location;
inserting a perforating tool having an outside surface and a spearhead or breakdown acid composition into the wellbore, wherein said outside surface of said tool is pre-treated prior to downhole insertion with a grease containing a first corrosion inhibitor component adapted to eliminate/minimize/reduce the corrosion inflicted upon it by the exposure of the acid for the duration of the fracking or stimulation and wherein said acidic composition comprises a second corrosion inhibitor component which reacts with said first corrosion inhibitor component to generate an active corrosion inhibitor, which forms a protective layer onto said surface;
positioning the tool at said predetermined location;
perforating the wellbore with the tool thereby creating a perforated area;
allowing the spearhead acid to come into contact with the perforated area for a predetermined period of time sufficient to prepare the formation for fracking or stimulation;
removing the tool from the wellbore; and
initiating the fracking of the perforated area using a fracking fluid.

Preferably, the first corrosion inhibitor component alone does not provide any corrosion protection but only does so when it is combined with another compound.

Preferably, the corrosion inhibiting composition further comprises a metal iodide or iodate selected from the group consisting of: cuprous iodide; potassium iodide, and sodium iodide.

According to another aspect of the present invention there is provided a method for spotting acid in a wellbore, said method comprising the steps of:
providing a wellbore in need of stimulation;
inserting a plug in the wellbore at a location slightly beyond a predetermined location;
inserting a perforating tool and a spearhead or breakdown acid into the wellbore;

positioning the tool at said predetermined location;
perforating the wellbore with the tool thereby creating a perforated area; and
allowing the spearhead acid to come into contact with the perforated area for a predetermined period According to a preferred embodiment of the present invention, the corrosion inhibitor composition is effective at a temperature of up to 110° C., and in some preferred compositions effective at temperature of up to 130° C.

According to one aspect of the present invention, the corrosion inhibitor composition provides effective protection to both carbon steel alloys as well as stainless steel for the duration period the tools are exposed to the acidic composition.

BRIEF DESCRIPTION OF THE FIGURES

Features and advantages of embodiments of the present application will become apparent from the following detailed description and the appended figures, in which.

DESCRIPTION OF THE INVENTION

Figure 1:
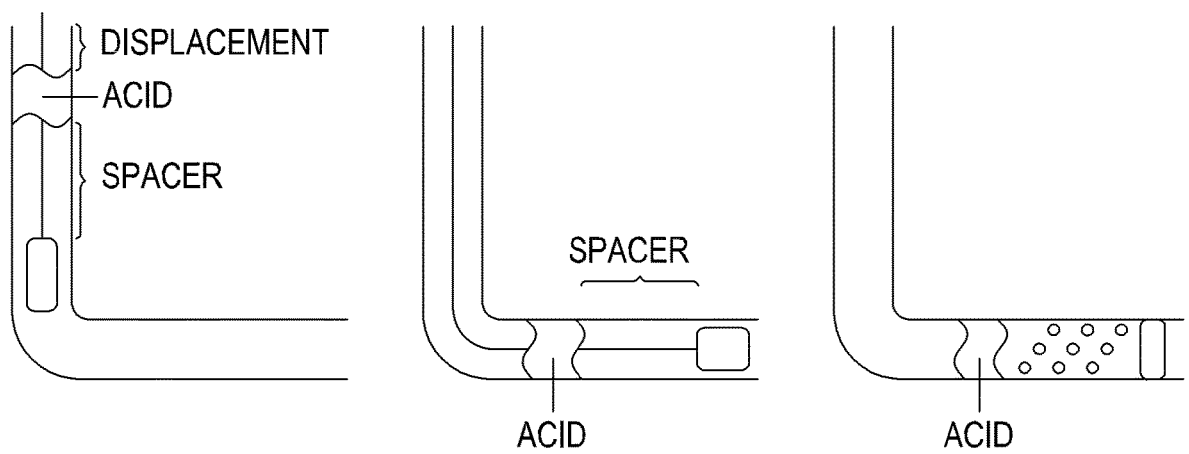
FIG. 1 is a schematic diagram illustrating the general steps according to a preferred method of the present invention.

The description that follows, and the embodiments described therein, is provided by way of illustration of an example, or examples, of particular embodiments of the principles of the present invention. These examples are provided for the purposes of explanation, and not limitation, of those principles and of the invention.

In a conventional plug and perf operation, the plug is set in the well, it is perforated by a tool (guns), then the tool is pulled out of the hole and then acid is pumped and circulated to the perforations (this process can take hours sometimes). Once a feed rate is reached, they begin the frac for that stage. The process is then repeated up to the number of stages (over 40 in many wells).

According to a preferred embodiment of the present invention, the method allows for an operator to pump the tools down with the spearhead acid in such a manner that the acid and the wireline/BHA (including the tool) are in contact with one another from the moment the BHA starts going down the wellbore to the predetermined position, to perforate the zone and let the acid sit over the perforations. This is followed by the removal of the tool from the wellbore and initiating of the fracturing immediately.

According to a preferred embodiment of the present invention, this method can save up to an average of about 1 hr per stage (up to 5 in the case of some tight formations) at an average cost of $20,000/hr (for the crew) and about 30-50 m³ of water per stage. In a 50-stage well, this can translate into savings of over $1,000,000 in time plus the saved water of up to 800,000 gallons. The potential savings from the implementation of this method in operations in the United States alone could reach upwards of several hundreds of millions of dollars per year.

HCl is the most commonly used acid in fracking. With this in mind, one must understand that perforation tools are mostly made of stainless steel to ensure longevity. Conventional plug and perforation processes require the removal of the perforation guns immediately after the perforation stage otherwise the spearhead acid would destroy the perforating guns because of their propensity to attack stainless steel. A critical factor in allowing a process to have stainless steel exposed to strong acids such as HCl is the ability to control, minimize or eliminate corrosion to a level below which would render a stainless-steel tool unusable after only a few uses (or even less).

According to one aspect of the present invention, there is provided a method of inhibiting the corrosion of a metal surface contacted by an aqueous acid solution, said method comprising the steps of:
providing a grease for application onto a wireline and a tool adapted for downhole use;
coating the wireline and tool with a grease, said grease comprising:
at least one corrosion inhibitor compound; and
a grease;
inserting the wireline and tool downhole to perform an oil industry operation;
injecting a corrosive liquid downhole thus exposing the wireline and tool for a period of time to said corrosive liquid; and
removing the wireline and tool from the wellbore after completion of said operation.

According to another aspect of the present invention, there is provided a method of inhibiting the corrosion of a metal surface contacted by an aqueous acid solution, said method comprising the steps of:
providing a grease for application onto a wireline and a tool attached to said wireline and adapted for downhole use;
coating the wireline and tool with a grease, said grease comprising:
at least one corrosion inhibitor compound; and
a grease;
inserting the wireline and tool downhole to perform an oil industry operation;
injecting a corrosive liquid downhole thus exposing the wireline and tool for a period of time to said corrosive liquid; and
removing the wireline and tool from the wellbore after completion of said operation.

Preferably, the at least one corrosion inhibitor compound present in the grease is selected from the group consisting of: a primary amine; a secondary amine and a tertiary amine. More preferably, the at least one corrosion inhibitor compound present in the grease is selected from the group consisting of: a primary amine; and a secondary amine.

Preferably, said tool is pre-treated prior to downhole insertion with a grease containing a corrosion inhibitor adapted to eliminate/minimize/reduce the corrosion inflicted upon it by the exposure of the acid for the duration of the fracking or stimulation.

According to a preferred embodiment, the grease used comprises highly refined mineral oil, petroleum distillates and additives designed for use in wireline applications. Preferably and as understood by the person skilled in the art, the greases which fall within the scope of the present invention can have some degree of variability between one another with respect to characteristics including, but not limited to: pH, melting point, freezing point, flammability, vapor pressure, flash point, vapour density, relative density, and viscosity.

Preferably, the method comprises a step of introducing an aqueous acid solution comprising a corrosion inhibiting composition into at least a portion of a subterranean formation, wherein the corrosion inhibiting composition comprises a reaction product of an alpha, beta-unsaturated aldehyde or an alpha, beta-unsaturated ketone with a primary, secondary, or tertiary amine, wherein the alpha, beta-unsaturated aldehyde comprises at least one aldehyde selected from the group consisting of: crotonaldehyde, 2-hexenal, 2-heptenal, 2-octenal, 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2-methylvinyl)]-2-n-octylethylene, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N-dimethylcarbamoylthio)cinnamaldehyde, p-chlorocinnamaldehyde, 5-phenyl-2,4-pentadienal, 7-phenyl-2,4,6-heptatrienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, 3,7-dimethyl-2,6-octadienal, and a beta-hydroxy aldehyde which dehydrates to form an alpha,beta-unsaturated aldehyde under acidic conditions.

Preferably, the method of inhibiting the corrosion of a metal surface contacted by an aqueous acid solution comprising the steps of: combining a corrosion inhibiting composition with the aqueous acid solution, the corrosion inhibiting composition comprising a reaction product of an alpha, beta-unsaturated aldehyde with a primary or secondary amine, the alpha, beta-unsaturated aldehyde comprising at least one aldehyde selected from the group consisting of: crotonaldehyde, 2-hexenal, 2-heptenal, 2-octenal, 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2-methylvinyl)]-2-n-octylethylene, dicinnamaldehyde, p-hydroxycinnamaldehyde, p-methyl cinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal) cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N-dimethylcarbamoylthio)cinnamaldehyde, p-chlorocinnamaldehyde, 5-phenyl-2,4-pentadienal, 7-phenyl-2,4,6-heptatrienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, 3,7-dimethyl-2,6-octadienal, and a beta-hydroxy aldehyde which dehydrates to form an alpha,beta-unsaturated aldehyde under acidic conditions; and then contacting the metal surface with the aqueous acid solution containing the corrosion inhibiting composition.

Preferably, the surfactant is selected from the group consisting of: a sultaine surfactant, a betaine surfactant, and/or combinations thereof. More preferably, the sultaine surfactant and betaine surfactant are selected from the group consisting of: an amido betaine surfactant, an amido sultaine surfactant, and/or combinations thereof. Yet even more preferably, the amido betaine surfactant is selected from the group consisting of: an amido betaine comprising a hydrophobic tail from C8 to C16. Most preferably, the amido betaine comprising a hydrophobic tail from C8 to C16 is cocamidobetaine.

Preferably also, the corrosion inhibition package further comprises an anionic surfactant. Preferably, the anionic surfactant is a carboxylic surfactant. More preferably, the carboxylic surfactant is a dicarboxylic surfactant. Even more preferably, the dicarboxylic surfactant comprises a hydrophobic tail ranging from C8 to C16. Most preferably, the dicarboxylic surfactant is sodium lauriminodipropionate.

Most preferred are embodiments of a corrosion inhibition package comprising cocamidopropyl betaine and β-alanine, N-(2-carboxyethyl)-N-dodecyl-, sodium salt (1:1).

According to a preferred embodiment of the present invention, when preparing an acidic composition comprising a corrosion inhibition package, metal iodides or iodates such as potassium iodide, sodium iodide, cuprous iodide, and lithium iodide can be added as corrosion inhibitor intensifiers. The iodide or iodate is preferably present in a weight/volume percentage ranging from 0.1 to 1.5%, more preferably from 0.25 to 1.25%, yet even more preferably 1% by weight/volume of the acidic composition. Most preferably, the iodide used is potassium iodide.

According to a preferred embodiment of the present invention, the corrosion package comprises: 2-propyn-1-ol, compd. with methyloxirane; β-alanine, N-(2-carboxyethyl)-N-dodecyl-, sodium salt (1:1); cocamidopropyl betaine; (±)-3,7-dimethyl-2,6-octadienal (citral); cinnamaldehyde; and isopropanol.

More preferably, the composition comprises 20% of 2-propyn-1-ol, compd. with methyloxirane; 20% of β-alanine, N-(2-carboxyethyl)-N-dodecyl-, sodium salt (1:1); 20% of cocamidopropyl betaine; 7.5% of (±)-3,7-dimethyl-2,6-octadienal (Citral); 12.5% cinnamaldehyde; and 20% of isopropanol (all percentages are volume percentages). A point of note, the surfactant molecules comprise only roughly ⅓ of the actual content of the entire surfactant blend as the balance, roughly ⅔, is comprised of water so as to control the viscosity of the surfactant when admixed with the other components. This is typical of surfactant blends in this and other industries.

According to a preferred embodiment of the present the corrosion inhibitor composition comprises cinnamaldehyde or a derivative thereof selected from the group consisting of: cinnamaldehyde; dicinnamaldehyde p-hydroxycinnamaldehyde; p-methylcinnamaldehyde; p-ethylcinnamaldehyde; p-methoxycinnamaldehyde; p-dimethylaminocinnamaldehyde; p-diethylaminocinnamaldehyde; p-nitrocinnamaldehyde; o-nitrocinnamaldehyde; 4-(3-propenal)cinnamaldehyde; p-sodium sulfocinnamaldehyde p-trimethylammoniumcinnamaldehyde sulfate; p-trimethylammoniumcinnamaldehyde o-methylsulfate; p-thiocyanocinnamaldehyde; p-(S-acetyl)thiocinnamaldehyde; p-(S—N,N-dimethylcarbamoylthio)cinnamaldehyde; p-chlorocinnamaldehyde; α-methylcinnamaldehyde; β-methylcinnamaldehyde; α-chlorocinnamaldehyde α-bromocinnamaldehyde; α-butylcinnamaldehyde; α-amylcinnamaldehyde; α-hexylcinnamaldehyde; α-bromo-p-cyanocinnamaldehyde; α-ethyl-p-methylcinnamaldehyde and p-methyl-α-pentylcinnamaldehyde.

According to a preferred embodiment, the acid is an aqueous modified acid composition comprising: a mineral acid and an alkanolamine in a molar ratio of not more than 15:1.

According to another preferred embodiment, the acid is an aqueous modified acid composition comprising: hydrochloric acid and an alkanolamine in a molar ratio of not more than 15:1.

According to a preferred embodiment, the acid is an aqueous modified acid composition according to claim 2, wherein the hydrochloric acid and alkanolamine are present in a molar ratio of not more than 10:1.

According to a preferred embodiment, the acid is an aqueous modified acid composition according to claim 2, wherein the hydrochloric acid and alkanolamine are present in a molar ratio of not more than 7.0:1. More preferably, hydrochloric acid and alkanolamine are present in a molar ratio of not more than 4:1. Even more preferably, hydrochloric acid and alkanolamine are present in a molar ratio of not more than 3:1.

According to a preferred embodiment, the alkanolamine is selected from the group consisting of: monoethanolamine, diethanolamine, triethanolamine, and/or combinations thereof. Preferably, the alkanolamine is monoethanolamine.

According to a preferred embodiment of the present invention, the method uses a synthetic acid composition comprising: a strong acid and an alkanolamine in a molar ratio of not more than 15:1; preferably in a molar ratio not more than 10:1, more preferably in a molar ratio of not more than 8:1; even more preferably in a molar ratio of not more than 5:1; yet even more preferably in a molar ratio of not more than 3.5:1; and yet even more preferably in a molar ratio of not more than 2.5:1.

Preferably, the main components in terms of volume and weight percent of the composition set out above comprise an alkanolamine and a strong acid, such as HCl, nitric acid, sulfuric acid, or sulfonic acid.

An alkanolamine, as per the above, contains at least one amino group, —$NH_2$, and one alcohol group, —OH. Preferred alkanolamines include, but are not limited to, monoethanolamine, diethanolamine, and triethanolamine. More preferred are monoethanolamine and diethanolamine. Most preferred is monoethanolamine. When added to hydrochloric acid a Lewis acid/base adduct is formed where the primary amino group acts as a Lewis base and the proton of the HCl as a Lewis acid. The formed adduct greatly reduces the hazardous effects of the hydrochloric acid on its own, such as the fuming effect, the hygroscopicity, and the highly corrosive nature. The excess nitrogen can also act as a corrosion inhibitor at higher temperatures.

The molar ratio of the two main components can be adjusted or determined depending on the intended application and the desired solubilizing ability. According to a preferred embodiment where the strong acid is HCl, one can increase the ratio of the HCl component to increase the solubilizing ability of the composition while still providing at least one of the following advantages: health, safety, environmental, and, operational advantages over hydrochloric acid.

Various corrosion inhibitors can be incorporated into an acid composition used in a preferred embodiment of the method according to the present invention, such composition comprises a strong acid and an alkanolamine to reduce corrosion on the steel which is contacted.

Preferably, the composition may further comprise organic compounds which may act as corrosion inhibitors selected from the group consisting of: acetylenic alcohols, aromatic or aliphatic unsaturated aldehydes (e.g. α,β-unsaturated aldehydes), alkylphenones, amines, amides, nitrogen-containing heterocycles (e.g. imidazoline-based), iminium salts, triazoles, pyridine and its derivatives or salts, quinoline derivatives, thiourea derivatives, thiosemicarbazides, thiocyanates, quaternary amine salts, and condensation products of carbonyls and amines. Intensifiers which can be incorporated into compositions according to the present invention are selected from the group consisting of: formic acid, potassium iodide, antimony oxide, copper iodide, sodium iodide, lithium iodide, aluminium chloride, bismuth oxide, calcium chloride, magnesium chloride and combinations of these. Preferably, an iodide compound such as potassium iodide is used. Other additives can be optionally added to a composition according to a preferred embodiment of the present invention. A non-limiting list of such common additives includes iron control agents (e.g. reducing agents), water-wetting surfactants, non-emulsifiers, de-emulsifiers, foaming agents, anti-sludging agents, clay and/or fines stabilizers, scale inhibitors, mutual solvents, and friction reducers. Alcohols and derivatives thereof, such as alkyne alcohols and derivatives and preferably propargyl alcohol and derivatives thereof can be used as corrosion inhibitors. Propargyl alcohol itself is traditionally used as a corrosion inhibitor which works well at low concentrations. It is however a very toxic/flammable chemical to handle as a concentrate, so care must be taken when exposed to the concentrate. In a composition used in the method according to the present invention, it is preferred to use 2-propyn-1-ol, complexed with methyloxirane, as this is a much safer derivative to handle. Basocorr® PP is an example of such a compound. Metal iodides or iodates such as potassium iodide, sodium iodide, cuprous iodide and lithium iodide can potentially be used as corrosion inhibitor intensifier along with the composition according to preferred embodiments of the present invention. In fact, potassium iodide is a metal iodide traditionally used as corrosion inhibitor intensifier, however it is expensive, but works extremely well. It is non-regulated and safe to handle. The iodide or iodate is preferably present in a weight percentage ranging from 0.1 to 5 wt %, more preferably from 0.2 to 3 wt %, yet even more preferably from 0.25 to 2 wt %.

EXAMPLE 1—PROCESS TO PREPARE A MODIFIED ACID COMPOSITION

Monoethanolamine (MEA) and hydrochloric acid are used as starting reagents. To obtain a 4.1:1 molar ratio of MEA to HCl, one must first mix 165 g of MEA with 835 g of water. This forms the monoethanolamine solution. Subsequently, one takes 370 ml of the previously prepared monoethanolamine solution and mixes with 350 ml of HCl aq. 36% (22 Baume). When additives are used, they are added after thorough mixing of the MEA solution and HCl. For example, potassium iodide can be added at this point as well as any other component desired to optimize the performance of the composition according to the present invention. Circulation is maintained until all products have been solubilized. Additional products can now be added as required.

The resulting composition of Example 1 is a clear (slightly yellow) liquid having shelf-life of greater than 1 year. It has a boiling point temperature of approximately 100° C. It has a specific gravity of 1.1±0.02. It is completely soluble in water and its pH is less than 1. The freezing point was determined to be less than −35° C.

The composition is biodegradable and is classified as a mild irritant according to the classifications for skin tests. The composition is substantially lower fuming compared to 15% HCl. Toxicity testing was calculated using surrogate information and the LD50 was determined to be greater than −1300 mg/kg. Preferred methanolamine:HCl composition comprise a composition having MEA:HCl in a 1:4.1 molar ratio, MEA-HCl in a 1:6.4 molar ratio, and MEA-HCl in a 1:9.9 molar ratio. Each one of these compositions has a transparent, slight yellow appearance. The respective specific gravity at 23° C. is 1.1, 1.121, and 1.135. Their % salinity is, respectively: 31.20%, 36.80%, and 40.00%. They all have a slight sharp or sharp odor. Their boiling point is 100° C. and they have a freezing point of −35° C. The acid strength, (in ml) in the presence of 1N NaOH is, respectively: 4.9, 6.3, and 7.5. Their pH is −0.11, −0.41, and −0.73, respectively.

According to a preferred embodiment of the present invention, the composition comprising an alkanolamine and a strong acid may further comprise a corrosion inhibition package itself comprising a terpene; a cinnamaldehyde or a derivative thereof; at least one amphoteric surfactant; and a solvent.

In other preferred embodiments of the present invention, 2-propyn-1-ol, complexed with methyloxirane can be present in a range of 0.05-5.0 wt/wt %, preferably it is present in an amount ranging from 0.1 to 3 wt %, even more preferably from 0.5 to 2.0 wt/wt % and yet even more preferably from 0.75 to 1.5 wt/wt %. As a substitute for potassium iodide one could use sodium iodide, copper iodide, and/or lithium iodide. However, potassium iodide is the most preferred.

According to a preferred embodiment of the present invention, there is provided a method of matrix acidizing a hydrocarbon-containing limestone formation, said method comprising:
providing a composition comprising a HCl and lysine mixture and water; wherein the molar ratio between the HCl and the lysine ranges from 4.5:1 to 8.5:1,
injecting said composition downhole into said formation at a pressure below the fracking pressure of the formation; and
allowing a sufficient period of time for the composition to contact said formation to create wormholes in said formation.

According to a preferred embodiment of the present invention, lysine & hydrogen chloride are present in a molar ratio ranging from 1:3 to 1:12.5; preferably in a molar ratio ranging from 1:4.5 to 1:9, and more preferably in a molar ratio ranging from more than 1:5 to 1:8.5.

According to another preferred embodiment of the present invention, the acid used is neat HCl.

The corrosion inhibitor composition further comprises a metal iodide or iodate selected from the group consisting of: cuprous iodide, potassium iodide, and sodium iodide. Preferably, the metal iodide or iodate is potassium iodide. According to another preferred embodiment of the present invention, the metal iodide or iodate is sodium iodide. According to yet another preferred embodiment of the present invention, the metal iodide or iodate is cuprous iodide.

Table 1 includes a prior composition (CI-A) and a composition according to a preferred embodiment of the present invention (CI-B).

TABLE 1

Composition of various tested corrosion inhibitor packages

|  |  | CI-A | CI-B |
|---|---|---|---|
| 2-Propyn-1-ol, compd. with methyloxirane | Vol % | 45 | 20 |
| .beta.-Alanine, N-(2-carboxyethyl)-N-dodecyl-, sodium salt (1:1) | Vol % | 11.7 | 20 |
| Cocamidopropyl betaine | Vol % | 11.7 | 20 |
| (±)-3,7-Dimethyl-2,6-octadienal (Citral) | Vol % | 7 | 7.5 |
| Cinnamaldehyde | Vol % | 0 | 12.5 |
| Isopropanol | Vol % | 24.6 | 20 |
| Total | Vol % | 100 | 100 |

Corrosion Testing

Corrosion inhibitor compositions according to preferred embodiments of the present invention were exposed to corrosion testing. The results of the corrosion tests and comparative corrosion testing are reported in Tables 2 through 5. Various steel grades (stainless steel and carbon steel) were subjected to acid compositions comprising corrosion inhibitors according to the present invention against known corrosion inhibitors to the listed compositions for various periods of time at varying temperatures. A desirable corrosion inhibition result was one where the lb/ft$^2$ corrosion number is at or below 0.05. More preferably, that number is at or below 0.02.

33% HCl:MEA in a 5.5:1 ratio and 50% HCl:MEA in a 5.5:1 ratio indicate the volume amount of the original concentration of a stock solution containing HCl and monoethanolamine in a ratio of 5.5:1. The HCl loading of a 33% HCl:MEA in a 5.5:1 ratio is approximately 6.5% HCl. The HCl loading of 50% HCl:MEA in a 5.5:1 ratio is approximately 10% HCl.

TABLE 2

Corrosion testing of 316 steel coupons with various acidic fluids at various temperatures for a duration of 12 hours at a temperature of 90° C.

| Steel type | Fluid | Corrosion inhibitor | Loss wt (g) | Surface area (cm$^2$) | Density (g/cc) | Mils/yr | Mm/year | Lb/ft$^2$ |
|---|---|---|---|---|---|---|---|---|
| 316 | 33% HCl:MEA in a ratio of 5.5:1 | 1.0% CI-A 0.75% CI-1A 0.1% NE-1 | 1.2899 | 20.968 | 7.92 | 2232.38 | 56.702 | 0.126 |
| 316 | 50% HCl:MEA in a ratio of 5.5:1 | 1.0% CI-A 0.75% CI-1A 0.1% NE-1 | 1.3647 | 20.968 | 7.92 | 2361.83 | 59.991 | 0.133 |

*33% and 50% indicate the level of the original concentration of a stock solution containing HCl and monoethanolamine in a ratio of 5.5:1.
** All percentages are given in volume/volume % of the total volume of the fluid. NE-1 is a non-emulsifier.

TABLE 3

Corrosion testing of various steel coupons with various acidic fluid at various temperatures for a duration of 6 hours

| Steel type | Fluid | Temp (° C.) | Corrosion inhibitor | Loss wt (g) | Surface area (cm$^2$) | Density (g/cc) | Mils/yr | Mm/year | Lb/ft$^2$ |
|---|---|---|---|---|---|---|---|---|---|
| 316 | 33% HCl:MEA in a ratio of 5.5:1 | 90 | 1.0% CI-A incl 0.1% ZA 0.75% CI-1A 0.1% NE-1 | 0.2706 | 20.968 | 7.92 | 936.63 | 23.79 | 0.026 |
| 316 | 33% HCl:MEA in a ratio of 5.5:1 | 90 | 2.0% CI-A 0.75% CI-1A 0.1% NE-1 | 0.5990 | 20.968 | 7.92 | 2073.33 | 52.66 | 0.058 |
| 316 | 33% HCl:Urea in a ratio of 1:0.7 | 90 | 0.75% CI-2 0.5% CI-4A 0.5% CI-1A 0.1% NE-1 | 0.8117 | 20.968 | 7.92 | 2809.56 | 71.36 | 0.079 |
| 316 | 33% HCl:MEA in a ratio of 5.5:1 | 90 | 2.0% CI-A 0.75% CI-1A 0.1% NE-1 | 1.1770 | 20.968 | 7.92 | 4073.98 | 103.48 | 0.115 |
| 316 | 33% HCl:MEA in a ratio of 5.5:1 | 90 | 0.75% CI-2 0.5% CI-4A 0.5% CI-1A 0.1% NE-1 | 1.1348 | 20.968 | 7.92 | 3927.91 | 99.77 | 0.110 |
| 316 | 33% HCl:MEA in a ratio of 5.5:1 | 90 | 1.50% CI-B 1.0% CI-1A 0.1% NE-1 | 0.1422 | 20.968 | 7.92 | 492.20 | 12.50 | 0.014 |
| 316 | 33% HCl:MEA in a ratio of 5.5:1 | 90 | 1.50% CI-B 1.0% CI-1A 0.1% NE-1 | 0.3277 | 20.968 | 7.92 | 756.18 | 19.21 | 0.032 |
| 316 | 50% HCl:MEA in a ratio of 5.5:1 | 90 | 1.50% CI-B 1.0% CI-1A 0.1% NE-1 | 0.1974 | 20.968 | 7.92 | 683.27 | 17.36 | 0.019 |
| 316 | 33% HCl:MEA in a ratio of 5.5:1 | 90 | 1.50% CI-B 1.0% CI-1A 0.1% NE-1 | 0.6878 | 20.968 | 7.92 | 1587.13 | 40.31 | 0.067 |
| 316 | 50% HCl:MEA in a ratio of 5.5:1 | 90 | 1.50% CI-B 1.0% CI-1A 0.1% NE-1 | 0.2246 | 20.968 | 7.92 | 777.41 | 19.75 | 0.022 |
| L80 | 33% HCl:MEA in a ratio of 5.5:1 | 90 | 1.50% CI-B 1.0% CI-1A 0.1% NE-1 | 0.147 | 28.922 | 7.86 | 370.68 | 9.42 | 0.010 |
| P110 | 33% HCl:MEA in a ratio of 5.5:1 | 90 | 1.50% CI-B 1.0% CI-1A 0.1% NE-1 | 0.112 | 34.839 | 7.86 | 236.15 | 5.998 | 0.007 |
| 316 | 33% HCl:MEA in a ratio of 5.5:1 | 90 | 1.50% CI-B 1.0% CI-1A 0.1% NE-1 | 0.0593 | 20.968 | 7.92 | 205.26 | 5.214 | 0.006 |

TABLE 3-continued

Corrosion testing of various steel coupons with various acidic fluid at various temperatures for a duration of 6 hours

| Steel type | Fluid | Temp (° C.) | Corrosion inhibitor | Loss wt (g) | Surface area (cm$^2$) | Density (g/cc) | Mils/yr | Mm/year | Lb/ft$^2$ |
|---|---|---|---|---|---|---|---|---|---|
| 316 | 33% HCl:MEA in a ratio of 5.5:1 | 110 | 1.50% CI-B 1.0% CI-1A 0.1% NE-1 | 0.2499 | 20.968 | 7.92 | 864.98 | 21.971 | 0.024 |
| L80 | 33% HCl:MEA in a ratio of 5.5:1 | 110 | 1.50% CI-B 1.0% CI-1A 0.1% NE-1 | 0.134 | 28.922 | 7.86 | 338.06 | 8.587 | 0.009 |
| P110 | 33% HCl:MEA in a ratio of 5.5:1 | 110 | 1.50% CI-B 1.0% CI-1A 0.1% NE-1 | 0.150 | 34.839 | 7.86 | 315.49 | 8.014 | 0.009 |
| QT900 | 33% HCl:MEA in a ratio of 5.5:1 | 110 | 1.50% CI-B 1.0% CI-1A 0.1% NE-1 | 0.082 | 34.839 | 7.86 | 171.50 | 4.356 | 0.005 |
| 316 | 50% HCl:MEA in a ratio of 5.5:1 | 110 | 1.50% CI-B 1.0% CI-1A 0.1% NE-1 | 0.1675 | 20.968 | 7.92 | 579.77 | 14.726 | 0.016 |
| L80 | 50% HCl:MEA in a ratio of 5.5:1 | 110 | 1.50% CI-B 1.0% CI-1A 0.1% NE-1 | 0.123 | 28.922 | 7.86 | 312.02 | 7.925 | 0.009 |
| P110 | 50% HCl:MEA in a ratio of 5.5:1 | 110 | 1.50% CI-B 1.0% CI-1A 0.1% NE-1 | 0.132 | 34.839 | 7.86 | 277.71 | 7.054 | 0.008 |
| QT900 | 50% HCl:MEA in a ratio of 5.5:1 | 110 | 1.50% CI-B 1.0% CI-1A 0.1% NE-1 | 0.084 | 34.839 | 7.86 | 176.11 | 4.473 | 0.005 |
| 316 | 7.5% HCl | 90 | 1.50% CI-B 1.0% CI-1A 0.1% NE-1 | 0.0729 | 20.968 | 7.92 | 252.33 | 6.409 | 0.007 |
| 316 | 10% HCl | 90 | 1.50% CI-B 1.0% CI-1A 0.1% NE-1 | 0.0406 | 20.968 | 7.92 | 140.53 | 3.569 | 0.004 |
| 316 | 15% HCl | 90 | 1.50% CI-B 1.0% CI-1A 0.1% NE-1 | 0.0254 | 20.968 | 7.92 | 87.92 | 2.233 | 0.002 |
| 316 | 10% HCl | 90 | 1.50% CI-A 1.0% CA 0.1% NE-1 | 0.0309 | 20.968 | 7.92 | 106.95 | 2.717 | 0.003 |

Notes:
CI-2 is a commercially available corrosion inhibitor (ASP 560)
NE-1 is a non-emulsifier.
CI-4A is propargyl alcohol with methyloxirane.
CI-1A is potassium iodide (10% w/vol water)
ZA refers to cinnamaldehyde

TABLE 4

Corrosion testing carried out at 110° C. for a duration of 6 hours on various types of steel

| Steel type | Fluid | Corrosion inhibitor | Loss wt. (g) | Surface area (cm$^2$) | Density (g/cc) | Mils/yr | Mm/year | Lb/ft$^2$ |
|---|---|---|---|---|---|---|---|---|
| 316 | 50% HCl:MEA in a ratio of 5.5:1 | 1.50% CI-B 1.0% CI-1A 0.1% NE-1 | 0.1675 | 20.968 | 7.92 | 579.77 | 14.726 | 0.016 |
| L80 | 50% HCl:MEA in a ratio of 5.5:1 | 1.50% CI-B 1.0% CI-1A 0.1% NE-1 | 0.123 | 28.922 | 7.86 | 312.02 | 7.925 | 0.009 |
| P110 | 50% HCl:MEA | 1.50% CI-B 1.0% CI-1A | 0.132 | 34.839 | 7.86 | 277.71 | 7.054 | 0.008 |

TABLE 4-continued

Corrosion testing carried out at 110° C. for a duration of 6 hours on various types of steel

| Steel type | Fluid | Corrosion inhibitor | Loss wt. (g) | Surface area (cm$^2$) | Density (g/cc) | Mils/yr | Mm/year | Lb/ft$^2$ |
|---|---|---|---|---|---|---|---|---|
| | in a ratio of 5.5:1 | 0.1% NE-1 | | | | | | |
| QT900 | 50% HCl:MEA in a ratio of 5.5:1 | 1.50% CI-B 1.0% CI-1A 0.1% NE-1 | 0.084 | 34.839 | 7.86 | 176.11 | 4.473 | 0.005 |

TABLE 5

Corrosion testing at 90° C. for a duration of 6 hours on stainless steel 316 coupons having a density of 7.92 g · cc and surface area of 20.968 cm$^2$

| Fluid | Corrosion inhibitor | Wt loss (g) | Mils/yr | Mm/year | Lb/ft$^2$ |
|---|---|---|---|---|---|
| 7.5% HCl | 0.50% CI-B 0.33% CI-1A 0.033% NE-1 | 0.0970 | 335.75 | 8.528 | 0.009 |
| 10% HCl | 0.50% CI-B 0.33% CI-1A 0.033% NE-1 | 0.0838 | 290.09 | 7.368 | 0.008 |
| 15% HCl | 0.50% CI-B 0.33% CI-1A 0.033% NE-1 | 0.0967 | 334.71 | 8.502 | 0.009 |
| 10% HCl | 0.50% CI-A 0.33% CI-1 A 0.033% NE-1 | 0.1729 | 598.46 | 15.201 | 0.017 |
| 33% HCl:Urea in a ratio of 1:0.7 | 1.50% CI-B 1.0% CI-1A 0.1% NE-1 | 0.7512 | 2600.15 | 66.044 | 0.073 |
| 10% HCl | No CI | 2.4590 | 8511.40 | 216.189 | 0.239 |

The corrosion testing results obtained indicate, in a preferred corrosion inhibitor developed, CI-B, the need for both an alkyne alcohol (propargyl alcohol) and cinnamaldehyde. Separately, they were not optimal. The difficulty with the use of cinnamaldehyde is to maintain it dispersed at higher temperatures such as 90° C. to 110° C. The surfactant package used according to a preferred embodiment of the present invention is capable of providing such cinnamaldehyde dispersion but requires higher loadings than usual. Citral has shown some effectiveness for the prevention of pitting at higher temperatures (even 110° C. to 120° C.). The cinnamaldehyde is an effective film former at these temperatures and was able to protect the stainless steel.

The testing results confirms the feasibility of a widespread implementation of the method according to a preferred embodiment of the present invention where the step of removing a perforating tool prior to injection of the spearhead acid composition. The inventors have also noted that by carefully balancing the acidic composition % content of active acid (for example HCl) with an appropriate corrosion inhibitor (or blend of several components to obtain a good performance corrosion inhibitor) one may apply this type of method to various other oilfield downhole operations where the acidic composition comprises a corrosion inhibitor and is sufficiently balanced to complete said operations within a reasonable time period which will leave the tool with minimal corrosion damage from exposure to the acidic composition.

The inventors have also noted that by diluting an initial concentrated acidic composition (whether it is HCl or a modified acid comprising an HCl component therein) and where said initial concentrated acidic composition already comprises a corrosion inhibitor package, the corrosion protection performance can be noticeably worse in a diluted composition as the CI components are fewer for a similar volume of acid. This surprising result has been more noticeable at elevated temperatures but should be understood to be part of the acidic composition blending strategy when "balancing" the acidic composition and its CI content. One way to balance the diluted acidic composition is to add one or more or even all of the CI components originally present in the CI package in the undiluted acidic composition. Another component to consider when balancing the acidic composition is to determine the downhole materials encountered as well as the casing and the tools (which are typically made of stainless steel).

Balancing comprises, among other things, altering the pH constantly as the dissolved cement raises the pH of the system as it is drilled out. It is desirable to maintain the minimal pH required "only" so as to increase the rate of penetration (ROP) to the optimal rate. Usually, the cement is not drilled out with pure acid (unless very tough drilling or maybe only to initiate the job) so as to control costs, reduce corrosion concerns etc. Preferably, the acid comprises an HCl component.

According to a preferred embodiment, the balancing of the acidic composition is done by adding more of at least one of the components present in the corrosion inhibitor package itself present in the undiluted acidic composition.

According to a preferred embodiment, the balancing of the acidic composition is done by altering the pH constantly as the dissolved cement raises the pH of the system as it is being dissolved by the acidic composition.

Typically, to perform a plug and perf operation, the concentration of the acid can vary from 4% (equivalent HCl content) to 15% (eq. HCl). One can perform at higher % but would not get much additional benefit and may cause some unwanted damage or unnecessary corrosion. Preferably, an acidic composition comprising a 7.5% (equivalent HCl content) is most often used to perform plug and perf operations. According to a preferred embodiment, the CI package and content is determined in accordance in order to optimize the financial aspect of the operation. This involves balancing the acidic composition (HCl eq. content), the CI package (price and performance) and value of the damage to the bottom hole assembly tool as well as the coil tubing or wireline or slickline used during the operation.

The inventors have noted that, surprisingly, modified acids containing urea are not desirable as they have a stability upper limit of approximately 80° C. Above this temperature, the urea component starts to decompose yielding $CO_2$ and ammonia, thereby neutralizing the acidic component and therefore, it would not be the ideal candidate for spearhead or wireline deployed spearhead operations as most operations are performed at temperatures close to or above 80° C. Corrosion inhibitor compositions according to preferred embodiment of the present invention have shown excellent versatility and stability at high temperature (up to 190° C.) between conventional acids (HCl) and modified acids (HCl:MEA) as well as steel types (QT900 (stainless steel); P110 (carbon steel); L80 (carbon steel); 316 (stainless steel)).

It was discovered that in some circumstances it may be preferably to isolate certain corrosion inhibition components from one another until one is ready to use the acidic composition. In those circumstances, it was discovered that one could have certain corrosion inhibition component present in a grease and another corrosion inhibition component present in an acidic composition which will be used. Under those circumstances, the corrosion inhibition component present in the grease (spread on a tool and wireline or slickline) is intended to react with the corrosion inhibitor component contained in the acidic composition. Upon reaction with one another, the new compound would deposit on the surface where the grease was applied and form a protective layer which would enhance corrosion inhibition. Such an approach to corrosion inhibition may be extremely desirable as it allows the use of a "final" compound which may otherwise lack long term stability when formulated directly by a manufacturer.

Other advantages include the ability to have the corrosion inhibitor placed exactly where it is needed (i.e. through the placement of the grease the new (or final inhibitor) will simply deposit or form a layer onto the surface coated by the grease).

According to a preferred embodiment of the present invention, the exposure time between the grease containing one of the components of the corrosion inhibitor and the acidic composition (containing the second or complementary component of the corrosion inhibitor should be maximized in order to promote the interaction between the component present in the acidic composition and the component present in the grease. This interaction leading to the generation of a corrosion inhibitor component which will greatly protect the wireline and any tool on the bottom hole assemble treated with the grease against acid-induced corrosion.

As illustrated in FIG. 1, pumping acid downhole while the wireline and perforating tool is present downhole has been shown in the field to save, in some instances 15 minutes per perforation operation. Moreover, the savings of water are equally staggering. During such operation, the wireline, and the perforating tool are in direct contact with the acidic composition from the moment the tool (and any other component of the BHA) is inserted into the wellbore until it reaches the predetermined location to be perforated. At which point the tool, wireline and any other component are still exposed to the acidic composition until at least after the perforation operation is completed.

The following is but a list of substantial advantages of performing such a method: combining pumping down the plug with displacing the ball and acid; reducing pump down cycle time; reducing volume of fluid required. The concerns noted by the operators were the following: defining fluid bypass around the plug; the method was dependent on the rate the plug was being pumped; and the rate achieved for pump down was variable from stage to stage.

EXAMPLE 2—WIRELINE TESTING EXPERIMENTS

Specific tests for a modified acid composition comprising an alkanolamine:HCl blend (present in a molar ratio of 1:6.4 also containing a corrosion inhibitor package) (diluted to one third of its stock solution, i.e. 33%) and a commercialised 7.5% HCl acid blend (containing a CI package) spearhead blend were performed on wireline samples to simulate long term field exposure conditions under extreme conditions. Due to cool down effect and limited real world exposure times, these tests would be indicative of a long-term duty cycle.

The tensile strength and corrosion tests were executed on wireline samples provided by Company B. One sample was exposed to 33% alkanolamine:HCl composition and another sample was exposed to the 7.5% HCl acid blend for 96 and 120 consecutive hours at 90° C. (194° F.) at 600 psi. The weight loss of the wireline samples is expected to be attributed not only the corrosion of the steel but also the degradation of the binding material. After the corrosion test cycle, tensile strength testing was conducted on two strands pulled from the wireline exposed to the 33% alkanolamine: HCl composition. The tensile strength values for each strand were equal to control samples that were not exposed to the acid. Tensile strength testing was not performed on the wireline exposed to the 7.5% HCl acid blend due to excessive corrosion.

EXAMPLE 3—P110 COUPON CORROSION TESTS

Long term corrosion tests on P110 coupons with a 33% alkanolamine:HCl composition and the 7.5% HCl acid blend at 90° C. (194° F.) were also carried out. The corrosion properties of the 33% alkanolamine:HCl composition was observed to provide superior protection in comparison to the 7.5% HCl acid blend over a long time period. The testing allows to select an ideal composition which will minimize corrosion to the wireline over a number of plug and perf operations. However, it should be noted that a less than optimal acidic composition (comprising a corrosion inhibitor) may be employed in order to substantially reduce time spent on pre-frac operations, minimize water volumes used and therefore, provide a financial advantage of performing this method as well as a substantial water usage reduction over the conventional approach used prior to this novel method.

Procedure: To determine the corrosion properties of unspent 33% alkanolamine:HCl composition and the 7.5% HCl acid blend (containing a CI package), the acid blends were evaluated at 90° C. (194° F.) on P110 coupons for 96 hours (4 days) at ambient pressure. The corrosion tests were executed in samples jars in a water bath. The corrosion rates were determined from the weight loss after the coupons were washed and dried.

Results: The testing results confirms the feasibility of a widespread implementation of the method according to a preferred embodiment of the present invention where the step of removing a perforating tool prior to injection of the spearhead acid composition is removed and the roll remains downhole during the acid breakdown step.

EXAMPLE 4—FIELD TRIAL

A major E&P company operating in Western Canada performing horizontal multi-stage slickwater completions on multi well pads used a plug and perf completion technique by targeting the Duvernay and Montney formations. Reservoir temperatures were approximately 230° F. Historically 15% HCl acid was used to breakdown the formation and assist in fracture propagation.

Figure 2A:
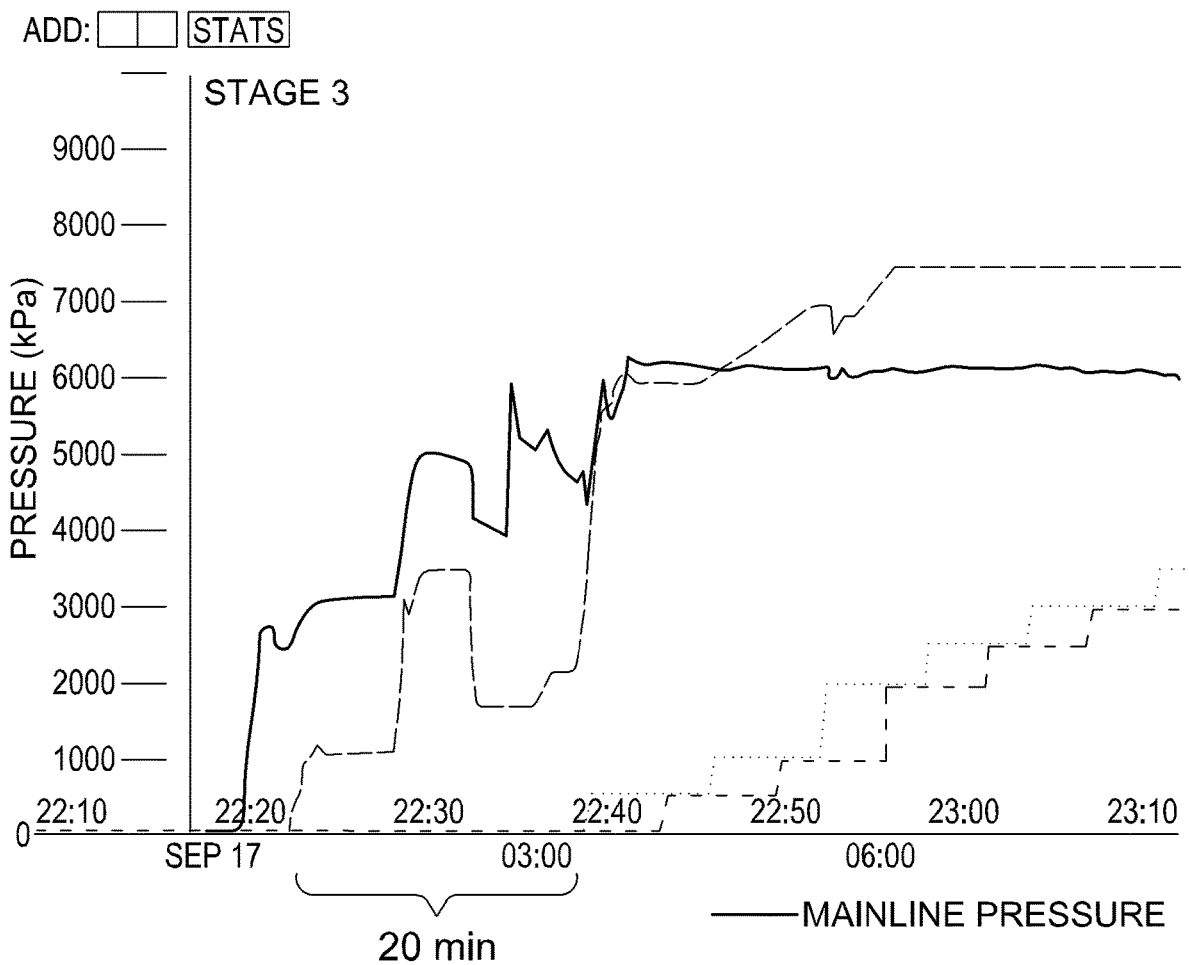
FIG. 2 illustrates a side-by-side comparison of the injection procedure in pre-fracking and fracking operations, the left graph showing the conventional process and the right graph showing a preferred embodiment of the method according to the present invention.
Figure 2B:
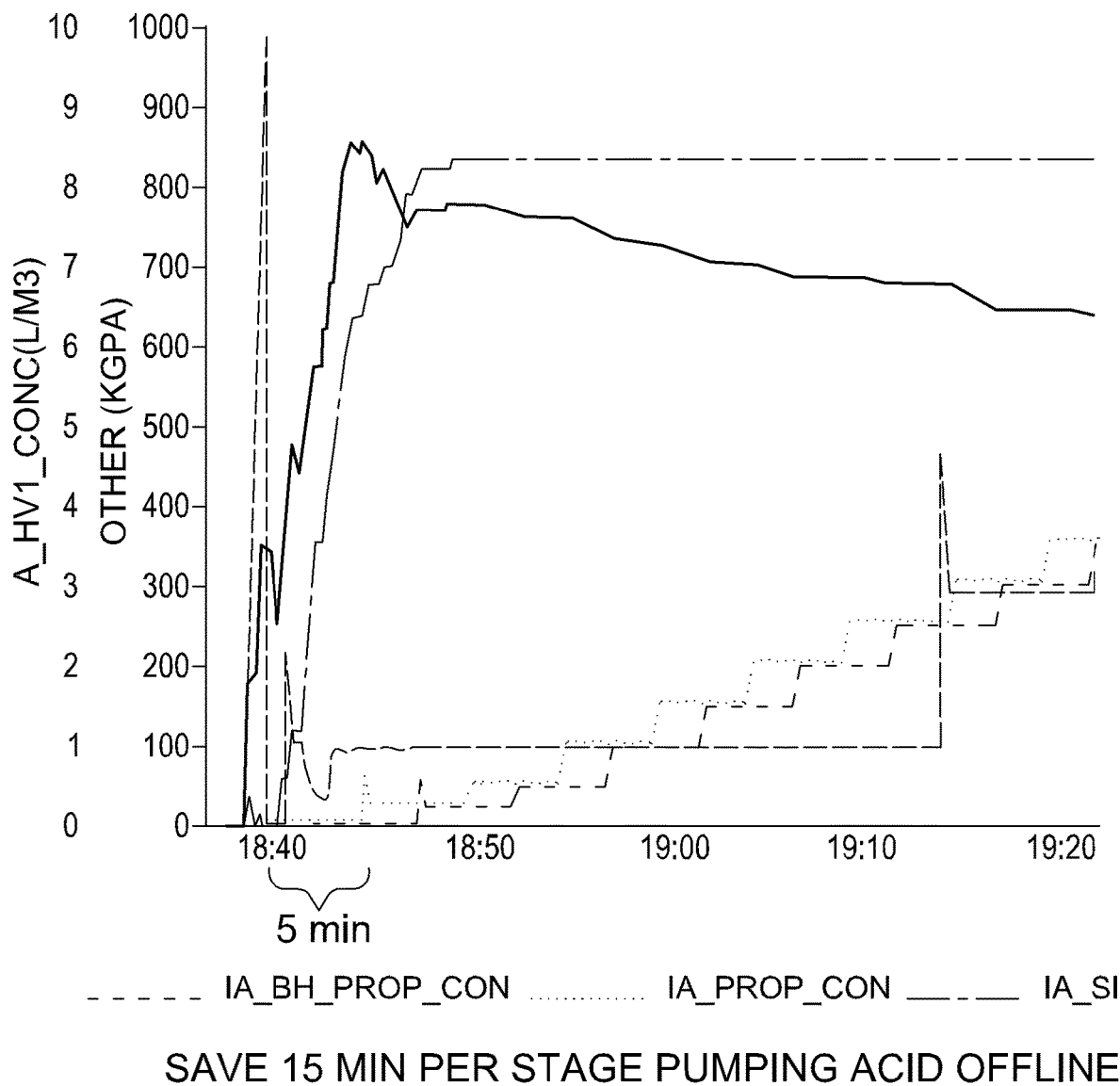

Approximately 97,500 gals of a modified acid using an alkanolamine:HCl composition with a corrosion package was delivered to location. Dilutions ranged from a 2-1 water-acid ratio to yield a 33% modified acid concentration and 1-1 for a 50% dilution. The blended modified acid (1300 gal) was placed in the wellbore and then the wireline and pump-down crews continued to the next well. As the treatment commenced, crews displaced acid to perforations with frac water. Once the acid reached the perforations an immediate pressure drop was observed, all frac pumps were brought on-line to pre-engineered rates and operations commenced. FIG. 2 illustrates the time advantage of using an embodiment of the method of the present invention (right graph) in comparison to the conventional method (left graph).

A significant pressure drop was observed as the acid reached the perforations and it was noted that breakdowns looked very similar to that obtained with 15% HCl which had been previously pumped on the same pad. Both the service company and operator were very pleased with the performance, ease of use of the acid while utilizing a technically advanced, safer and more environmentally responsible product along with eliminating corrosion concerns was a major addition of value to the customer and all involved with the project. The modified acid composition allowed the company to have confidence that the casing metals were free from hydrogen embrittlement and any corrosion related issue that would have arisen by utilizing HCl. This time saving method would not be possible with any existing HCl blends offered in the market. Observations by the crew included the time savings. Moreover, the company and pumping crews on location had the opportunity to use an acid which has an inherent safety profile adapted to minimize or eliminate the extremely dangerous properties associated with 15% HCl. Some of the safety factors include: less-corrosive to dermal tissue; low-vapor pressure effect (fuming); low-toxicity (Calculated LD-50 Rat); lower bioaccumulative effect; and biodegradable.

Along with the safety aspect of the acid composition used, there is also the technical advantages it brought to the operations: low corrosion properties—<0.02 lb/ft$^2$ for more than 24 hrs; pump acid with wireline BHA (save time and water); in the event of surface equipment failure occur, there is no need to flush acid out of wellbore; the composition is hauled as a concentrate and diluted on location; provides the ability to adjust acid strength for tougher breakdowns; fewer acid trucks on the road (landowner optics); it is a class one product (chemicals will not separate out over time); and it can be diluted with available water (produced/sea water/fresh). Additional benefits of the modified acid used in the example include: ultra-low long term corrosion effects (168 hrs); no precipitation of solubilized Ca post pH increase (eliminating risks of formation damage); clear: low fuming/vapor pressure; aggressive reaction rates on stimulations and workovers; custom blend allowing spotting of acid with perforating guns via wireline; compatible with typical elastomers used in oil and gas; allows to adjust concentrations on the fly to target optimal pay zones; and it has a high thermal stability up to ~190° C.

EXAMPLE 5—FIELD TRIAL #2

Figure 3A:
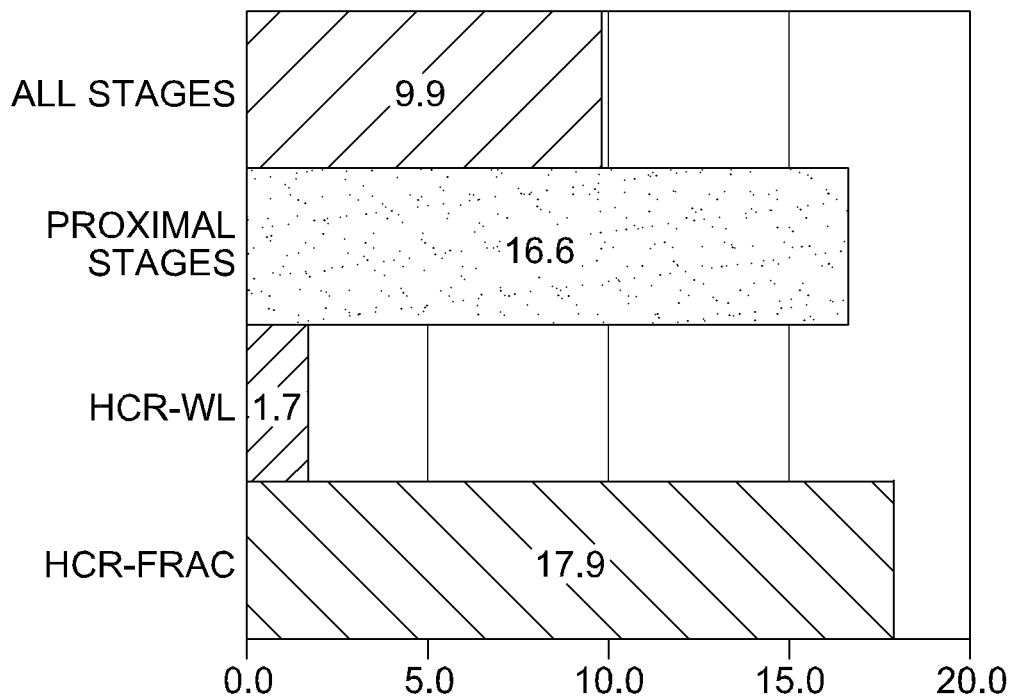
FIG. 3 illustrates a side-by-side bar graph comparison of the various stage times in the pre-fracking and fracking operations, the left graph showing a preferred embodiment of the method according to the present invention, the right graph showing the conventional process.
Figure 3B:
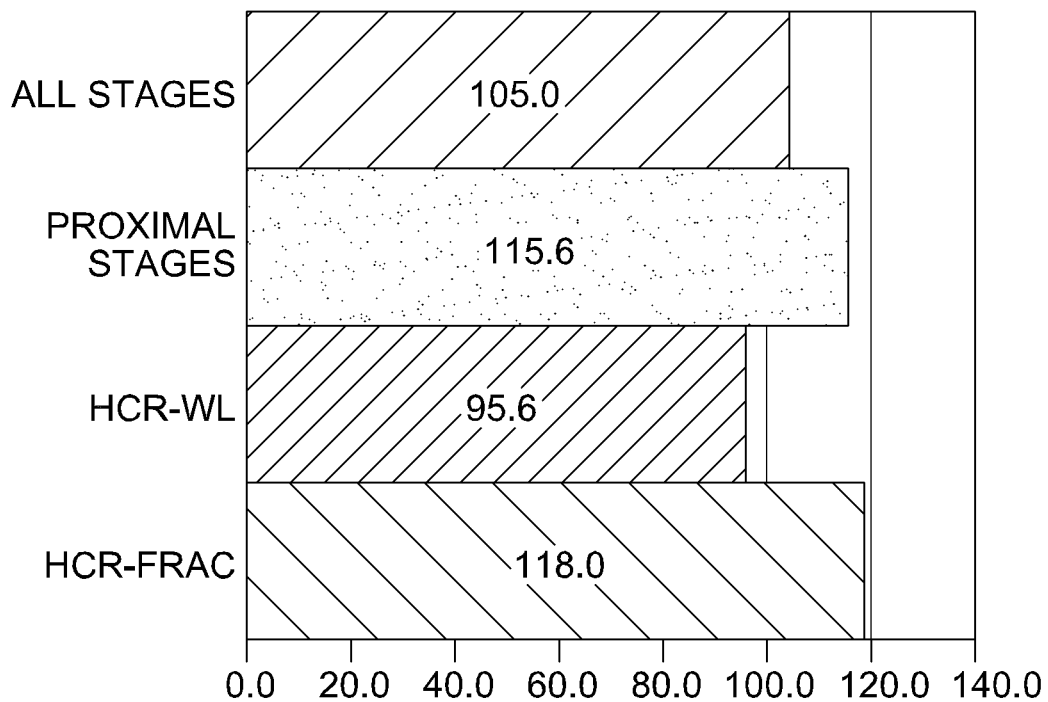

Another large oil and gas company carried out wireline plug and perf operations and collected the below information in terms of performance. The average time from start of pumping to start of sand was determined to be 8.2 mins faster for wireline stages where the tools and wireline went downhole together, compared to the average of all other stages. The average stage pump times were determined to be 9.4 mins lower for the wireline stages where acid was injected along with the perforating tool and wireline, compared to average of all other stages. See FIG. 3 which highlights the difference in time for each step.

The company using the method according to a preferred embodiment of the present invention, noted the following spearhead operational efficiencies: the ability to pump acid with wireline and BHA (guns and bridge plug); the elimination of the need to displace acid after wireline is out of the hole; the reduced water requirements; savings of at least one hole volume per frac (>10,000 gal water reduction per stage); allowing acid to be spotted over the entire perf interval cluster; more effective cluster breakdown; increased frac crew efficiency; and shorter time to initiate the frac and get to job rates.

EXAMPLE 6—CORROSION TESTING ON VARIOUS WIRELINES

Corrosion testing was carried out on various manufacturers' wirelines using an acidic composition comprising an alkanolamine:HCl blend with a corrosion inhibitor package. The wireline material of four different manufacturers were tested corrosion resistance at a temperature of 130° C. and at 400 psi for periods of time ranging up to 24 hours of exposure. Table 7 (below) provides a summary of the corrosion data from this testing series.

TABLE 7

Corrosion test results of 33% composition comprising MEA:HCl (in 1:4.1 molar ratio) at 130° C. (266° F.) at 400 psi over various time periods

| | | Cumulative Weight Loss | | | | | | | |
|---|---|---|---|---|---|---|---|---|---|
| | | 6 hrs | | 12 hrs | | 18 hrs | | 24 hrs | |
| Test | Sample | mm/yr | lb/ft$^2$ | mm/yr | lb/ft$^2$ | mm/yr | lb/ft$^2$ | mm/yr | lb/ft$^2$ |
| A | #1 clear wire | 19.727 | 0.022 | 22.121 | 0.024 | 25.423 | 0.028 | 28.146 | 0.031 |
| B | #2 clear wire | 18.902 | 0.021 | 20.800 | 0.023 | 23.854 | 0.026 | — | — |
| C | #3 clear wire | 19.810 | 0.022 | 23.772 | 0.026 | 27.651 | 0.030 | — | — |
| D | Sanded wire | 17.334 | 0.019 | 20.470 | 0.022 | 23.277 | 0.026 | 28.229 | 0.031 |

The results support the applicability, feasibility of the method according to a preferred embodiment of the present invention. Moreover, more optimal compositions falling within the scope of the present invention can be developed in order to obtain better financial, water-savings and/or corrosion results.

EXAMPLE 7—CORROSION TESTING ON VARIOUS WIRELINES

Figure 4:
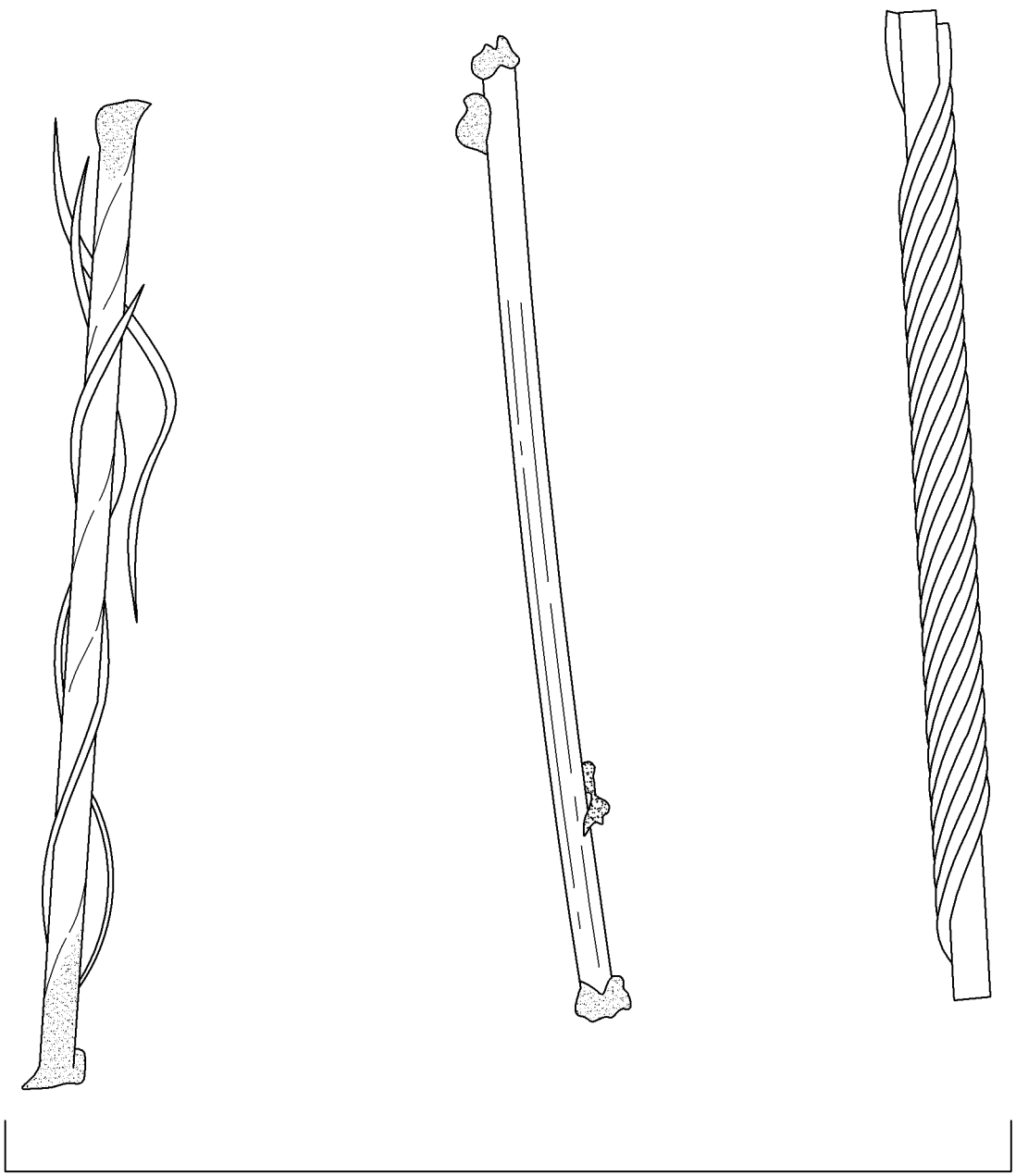
FIG. 4 is a photograph of three wirelines exposed to acid for a period of 48 hours where exterior (outside) surface the wirelines where treated with different compositions.

A visual corrosion testing was carried out on wireline using three different coatings. FIG. 4 is a photograph of three wirelines exposed to acid (MEA-HCl (in a 1:4.1 molar ratio at a 33% dilution in water) for a period of 48 hours at 60° C. where the exterior (outside) surface of the wirelines where treated with different compositions. The wireline sample on the left was treated with grease which did not contain any corrosion inhibiting component. The wireline sample in the middle was treated with grease which contained citral as a corrosion inhibiting component. The wireline sample on the right was treated with grease which contained citral as corrosion inhibiting component and the acid contained component B2 (.beta.-Alanine, N-(2-carboxyethyl)-N-dodecyl-, sodium salt (1:1)), which is a corrosion inhibiting component.

Upon visual inspection of the three samples of the same wireline wire, it is clear that the left wireline sample was practically completely stripped of its wire sheathing. The middle wireline sample was completely stripped of its wire sheathing. The right wireline sample was virtually unaffected by its exposure to acid by having a complementary corrosion inhibitor component present in the acid. It is worth noting that the acid strength was the same in all three samples and the acidic composition only differed between the first two samples and the last sample with the presence of component B2.

In light of this testing, it clearly supports an approach of having complementary corrosion inhibitor components which are present in two different compositions and which react together once they are put into contact with one another. This facilitates both the manufacturing of the acidic composition as well as the grease. This can also allow operators to tailor either the grease of the acidic composition in the field in order to adapt to unforeseen circumstances.

According to a preferred embodiment of the present invention, the corrosion inhibitor composition comprises the reaction product of an alpha,beta-unsaturated aldehyde or ketone with a primary, secondary, or tertiary amine.

According to a preferred embodiment of the present invention, the corrosion inhibitor composition can be formulated prior to insertion into the acidic composition or the alpha,beta-unsaturated aldehyde or ketone and the primary, secondary, or tertiary amine can be added directly to the grease for subsequent application onto the wireline/slickline and tools.

According to another preferred embodiment of the present invention, either one of the alpha,beta-unsaturated aldehyde or ketone and the primary, secondary, or tertiary amine of the corrosion inhibitor composition can be added to the grease while the other is added to the acidic composition and the subsequent contact between the grease and the acidic composition providing the interaction between the alpha,beta-unsaturated aldehyde or ketone and the primary, secondary, and tertiary amine to "activate" the corrosion inhibition. Such a treatment provides advantages as to yet unforeseen as some compounds are found to be more difficult to formulate into a grease than others. This allows efficient corrosion inhibition all the while permitting a novel method of combining the necessary corrosion inhibition components. According to a preferred embodiment of the present invention, when using a primary or secondary amine, such is selected from the group consisting: ethanolamine, diethanolamine, partially ethoxylated dehydroabietylamine, ethylamine, diethylamine, dehydroabietylamine, propylamine, dipropylamine, propanolamine, isopropanolamine, 2-propanol-1-amine, diisopropanolamine, butylamine, dibutylamine, tert-butylamine, pentylamine, dipentylamine and tert-benzyl-tert-butylamine.

According to another aspect of the present invention, there is provided a method to perform a downhole operation for drilling with acid to increase ROP (rate of penetration) through cement plugs, said method comprises the following steps:

inserting a drilling tool inside a wellbore, wherein said tool is pre-treated prior to downhole insertion with a grease containing a corrosion inhibitor adapted to eliminate/minimize/reduce the corrosion inflicted upon it by the exposure of the acid for the duration of the fracking or stimulation;

injecting an acidic composition concurrently with the drilling tool;

position the drilling tool within the wellbore at a point requiring drilling;

contacting the surface requiring drilling with the acid and begin drilling; and continue the drilling operation until desired distance has been achieved;

where the acidic composition comprises a corrosion inhibitor described above and is sufficiently balanced to complete the operation of dissolving the acid soluble debris within a time period which will leave the tool with minimal corrosion damage from exposure to the acidic composition.

According to another aspect of the present invention, there is provided a method to perform a downhole operation for coiled tubing deployed acid washes, said method comprises the following steps:

inserting a coiled tubing inside a wellbore, wherein said coiled tubing is pre-treated prior to downhole insertion with a grease containing a corrosion inhibitor adapted to eliminate/minimize/reduce the corrosion inflicted upon it by the exposure of the acid for the duration of the fracking or stimulation;

injecting an acidic composition concurrently with the coiled tubing;

position the coiled tubing within the wellbore at a point requiring an acid wash treatment;

contacting the surface requiring acid wash treatment with the acid; and continue the acid wash treatment operation until predetermined treatment has been achieved; where the acidic composition comprises a corrosion inhibitor as described above and is sufficiently balanced to complete the operation of dissolving the acid soluble debris within a time period which will leave said tool with minimal corrosion damage from exposure to the acidic composition.

According to another aspect of the present invention, there is provided a method to perform a downhole operation for coiled tubing deployed filter cake treatments said method comprises the following steps:

inserting a coiled tubing inside a wellbore, wherein said coiled tubing is pre-treated prior to downhole insertion with a grease containing a corrosion inhibitor adapted to eliminate/minimize/reduce the corrosion inflicted upon it by the exposure of the acid for the duration of the fracking or stimulation;

injecting an acidic composition concurrently with the coiled tubing position the coiled tubing within the wellbore at a point requiring a treatment on said filter cake;

contacting the surface requiring treatment with the acidic composition; and allow contact between the acidic composition and the filter cake until the filter cake has been effectively treated or removed from the walls of the wellbore;

where the acidic composition comprises a corrosion inhibitor as described above and is sufficiently balanced to complete the operation of dissolving the filter cake within a time period which will leave the tool with minimal corrosion damage from exposure to the acidic composition.

It is often desirable to seal tubing or other pipe in the casing of the well, for example when cement or another type of slurry must be pumped down the tubing and force the slurry out into a formation. In such instances, one must be able to seal the tubing with respect to the well casing and to prevent the fluid pressure of the slurry from lifting the tubing out of the well. This can be accomplished by packers and bridge plugs as well as balls in cage valves.

According to another aspect of the present invention, there is provided a method to perform a downhole operation for dissolving plugs and/or balls; wherein said method comprises the following steps:

injecting an acidic composition down the wellbore at a position proximate said ball using an injection tool, wherein said injection tool is pre-treated prior to downhole insertion with a grease containing a corrosion inhibitor adapted to eliminate/minimize/reduce the corrosion inflicted upon it by the exposure of the acid for the duration of the fracking or stimulation;

allowing sufficient contact time for the acidic composition to dissolve said plug/ball to allow further processing to occur, where the acidic composition comprises a corrosion inhibitor as described above and is sufficiently balanced to complete the operation of dissolving the plug and/or ball within a time period which will leave the tool with minimal corrosion damage from exposure to the acidic composition, and wherein the acidic composition comprises a corrosion inhibitor package as described above. Preferably, the injection tool is any tool, tube, piping which can deliver the acidic composition without breaking down in a short-term use (less than one hour).

According to another aspect of the present invention, there is provided a method to perform a downhole operation for slower (matrix) rate isolated (thru coil) acid stimulations, wherein said method comprises the following steps:

providing a wellbore comprising at least one area requiring matrix acidization;

injecting an acidic composition down the wellbore at a position proximate said area requiring matrix acidization, wherein said tool is pre-treated prior to downhole insertion with a grease containing a corrosion inhibitor adapted to eliminate/minimize/reduce the corrosion inflicted upon it by the exposure of the acid for the duration of the stimulation;

allowing sufficient contact time for the acidic composition to perform the matrix acidization step;

optionally, remove the tool;

optionally, further process the acidized formation, where the acidic composition comprises a corrosion inhibitor as described above and is sufficiently balanced to complete the operation of dissolving the acid soluble matrix within a time period which will leave the tool with minimal corrosion damage from exposure to the acidic composition.

According to another aspect of the present invention, there is provided a method to perform a downhole operation for fishing tools in the presence of an acid to consume debris on top of the tool to be recovered, wherein said method comprises the following steps:

injecting an acidic composition down the wellbore concurrently with a fishing tool at a position proximate said tool to be recovered, wherein said fishing tool is pre-treated prior to downhole insertion with a grease containing a corrosion inhibitor adapted to eliminate/minimize/reduce the corrosion inflicted upon it by the exposure of the acid for the duration of the fishing operation;

allowing sufficient contact time for the acidic composition to dissolve the ball to allow further processing to occur.

where the acidic composition comprises a corrosion inhibitor as described above and is sufficiently balanced to complete the operation of dissolving the acid soluble debris within a time period which will leave the tool with minimal corrosion damage from exposure to the acidic composition.

According to another aspect of the present invention, there is provided a method to perform a downhole operation for stuck coil or tools in casing, where the jammed coil or tool is caused by an acid soluble debris, said method comprising the steps of:

injecting an acidic composition in the wellbore using an injection tool, wherein said tool is pre-treated prior to downhole insertion with a grease containing a corrosion inhibitor adapted to eliminate/minimize/reduce the corrosion inflicted upon it by the exposure of the acid for the duration of the operation;

directing the acidic composition at a point within the wellbore where said coil is stuck; and allowing the acidic composition sufficient contact time at and near said area to allow the acid soluble debris to be dissolved by the acidic composition, where the acidic composition comprises a corrosion inhibitor as described above and is sufficiently balanced to complete the operation of dissolving the acid soluble debris within a time period which will leave the tool with minimal corrosion damage from exposure to the acidic composition. Preferably, the following are some of the tools that may be used as part of a bottom hole assembly (BHA): drilling motors, washing tools, perforating guns, fishing tools, plugs, balls, and any BHA with a high stainless steel metal content in general.

According to another aspect of the present invention, there is provided a method to perform a debris and scale management inside wellbores when having both a tool and an acid present at the same time. According to a preferred embodiment of a method of the present invention, one can perform spotting acid to dislodge stuck pipes inside a wellbore. Preferably, coiled tubing or a BHA (bottom hole assembly) injected into the wellbore can help free downhole in situ items like chokes or flow-controls, safety valves, etc. According to a preferred embodiment of a method of the present invention, one can perform an operation to clean a wellbore with a reaming tool in the presence of an acid.

According to another aspect of the present invention, there is provided a method to perform a downhole operation for spotting acid in a wellbore, said method comprising the steps of:

providing a wellbore in need of stimulation;

inserting a plug in the wellbore at a location slightly beyond a predetermined location;

inserting a perforating tool and a spearhead or breakdown acid into the wellbore; wherein said tool is pre-treated prior to downhole insertion with a grease containing a corrosion inhibitor adapted to eliminate/minimize/reduce the corrosion inflicted upon it by the exposure of the acid for the duration of the fracking or stimulation;
positioning the tool at said predetermined location;
perforating the wellbore with the tool thereby creating a perforated area; and
allowing the spearhead acid to come into contact with the perforated area for a predetermined period of time sufficient;
where the acidic composition comprises a corrosion inhibitor as described above and is sufficiently balanced to complete the operation of dissolving the acid soluble debris within a time period which will leave the tool with minimal corrosion damage from exposure to the acidic composition.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method for fracking or stimulation of a hydrocarbon-bearing formation, said method comprising:
provided a wellbore to be stimulated;
inserting a plug in the wellbore at a predetermined location;
inserting a perforating tool having an outside surface and a spearhead acidic composition into the wellbore;
wherein said outside surface of said perforating tool is pre-treated prior to downhole insertion with a grease containing a first corrosion inhibitor component adapted to reduce corrosion inflicted upon it by an exposure to the spearhead acidic composition for a duration of the fracking or stimulation and wherein said spearhead acidic composition comprises a second corrosion inhibitor component which reacts with said first corrosion inhibitor component to generate an active corrosion inhibitor, which forms a protective layer onto said outside surface of said perforating tool;
positioning the perforating tool proximate said predetermined location;
perforating the wellbore with the perforating tool thereby creating a perforated area;
allowing the spearhead acidic composition to come into contact with the perforated area for a predetermined period of time sufficient to prepare the formation for fracking or stimulation;
removing the perforating tool from the wellbore; and
initiating the fracking or stimulation of the perforated area using a fracking fluid.

* * * * *